United States Patent
Zhou et al.

(10) Patent No.: US 9,665,145 B2
(45) Date of Patent: May 30, 2017

(54) POWER EXTENDING BOARD AND POWER SUPPLY SYSTEM AND ELECTRONIC DEVICE USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wu Zhou, Shenzhen (CN); Xiao-Gang Yin, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 905 days.

(21) Appl. No.: 14/048,155

(22) Filed: Oct. 8, 2013

(65) Prior Publication Data

US 2014/0175884 A1    Jun. 26, 2014

(30) Foreign Application Priority Data

Dec. 24, 2012  (CN) .......................... 2012 1 0564786

(51) Int. Cl.
*H02M 7/02* (2006.01)
*G06F 1/26* (2006.01)

(52) U.S. Cl.
CPC ............. *G06F 1/26* (2013.01); *Y10T 307/406* (2015.04); *Y10T 307/707* (2015.04)

(58) Field of Classification Search
CPC .................................................. Y10T 307/707
USPC ..................................................... 307/82, 147
See application file for complete search history.

(56) References Cited

U.S. PATENT DOCUMENTS

| | | | | |
|---|---|---|---|---|
| 9,385,494 B2* | 7/2016 | Feng | ....................... | H01R 29/00 |
| 2005/0148245 A1* | 7/2005 | Tsai | ....................... | H01R 27/02 |
| | | | | 439/630 |
| 2009/0276615 A1* | 11/2009 | Huang | ................ | G06F 11/1417 |
| | | | | 713/2 |
| 2012/0270418 A1* | 10/2012 | Tian | ....................... | H05K 1/117 |
| | | | | 439/55 |

* cited by examiner

*Primary Examiner* — Fritz M Fleming
(74) *Attorney, Agent, or Firm* — Steven Reiss

(57) ABSTRACT

An exemplary electronic device includes a mother board, a power source, and a power extending board detachably connected between the power source and the motherboard. The power source includes a golden finger interface. The power extending board includes a receiving socket, a first conversion circuit, and a first connector. The golden finger interface is plugged into the receiving socket. The first conversion circuit is connected to the receiving socket, converts first and second voltages from the power source into third and fourth voltages, and outputs the first, third, and fourth voltages to the motherboard.

20 Claims, 1 Drawing Sheet

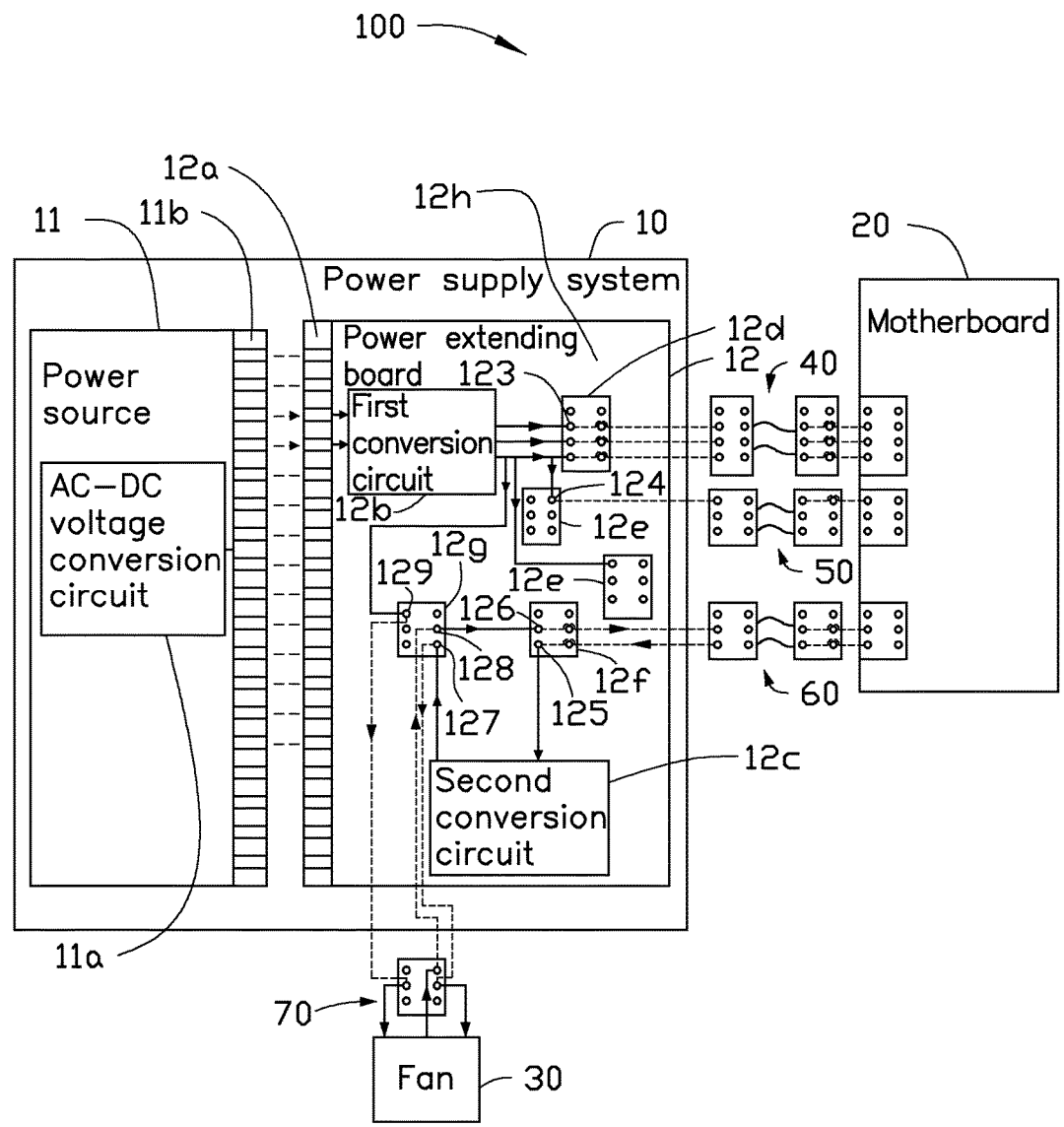

POWER EXTENDING BOARD AND POWER SUPPLY SYSTEM AND ELECTRONIC DEVICE USING SAME

BACKGROUND

1. Technical Field

The present disclosure relates to a power extending board, a power supply system using the power extending board, and an electronic device using the power supply system.

2. Description of Related Art

A power supply converts an alternating current (AC) voltage into a direct current (DC) voltage to supply power to electronic devices. A power interface of the power supply includes a cable interface and a golden finger interface. The cable interface is configured to connect to a motherboard having a standard power interface of the electronic device. However, the golden finger interface is configured to connect to a motherboard having a golden finger interface of the electronic device, but cannot connect to the motherboard having the standard power interface. Accordingly, use of the power supply having the golden finger interface is limited.

Therefore, what is needed is an item that can overcome the described limitations.

BRIEF DESCRIPTION OF THE DRAWINGS

The FIGURE is a schematic structural diagram illustrating one embodiment of an electronic device according to the present disclosure.

DETAILED DESCRIPTION

Reference will now be made to the drawings to describe specific exemplary embodiments of the present disclosure.

In order to express electrical connections between electronic components clearly, broken lines are used to designate plug connections between two connectors or two power interfaces, and solid lines are used to designate electrical connections between other electrical components in the FIGURE.

The FIGURE is a schematic structural diagram illustrating one embodiment of an electronic device 100. The electronic device 100 includes a power supply system 10, a motherboard 20, a fan 30, a first data line 40, a second data line 50, a third data line 60, and a fourth data line 70. The power supply system 10 is detachably connected to the motherboard 20 via the first, second, and third data lines 40, 50, 60. The fan 30 is detachably connected to the power supply system 10 via the fourth data line 70. The power supply system 10 is configured to supply electrical power to the motherboard 20 and the fan 30. In addition, the power supply system 10 is configured to relay a first control signal from the motherboard 20 to the fan 30 and relay a feedback signal from the fan 30 to the motherboard 20. The first control signal controls a rotational speed of the fan 30. The feedback signal represents an instantaneous rotational speed of the fan 30. The motherboard 20 processes various data signals and executes corresponding functions. The motherboard 20 includes a plurality of connectors (not labeled) located thereon. The fan 30 dissipates heat generated by the motherboard 20. The first, second, and third data lines 40, 50, 60 each include a cable (not labeled) and two connectors (not labeled) connected to two ends of the cable, respectively. The fourth data line 70 includes a cable (not labeled) and a connector (not labeled). One end of the cable of the fourth data line 70 is connected to the fan 30, and the other end of the cable of the fourth data line 70 is connected to the connector of the fourth data line 70.

The power supply system 10 includes a power source 11 and a power extending board 12 detachably connected to the power source 11. The power source 11 includes an alternating current-direct current (AC-DC) voltage conversion circuit 11a and a golden finger interface 11b connected to the AC-DC voltage conversion circuit 11a. The AC-DC voltage conversion circuit 11a receives AC voltage from an external AC power source (not shown) and converts the received AC voltage into DC voltages. The DC voltages include a first voltage and a second voltage. In the present embodiment, both the first and second voltages are 12 volts (V). In this embodiment, the second voltage is generated prior to the first voltage. Once the power source 11 is connected to the external AC power source, the power source 11 first generates the second voltage, so as to initialize the electronic device 100. When the electronic device 100 is started up and running normally, the power source 11 generates the first voltage, so as to drive the electronic device 100. In alternative embodiments, the first voltage and the second voltage may be different from each other.

The power extending board 12 includes a receiving socket 12a, a first conversion circuit 12b, a second conversion circuit 12c, a first connector 12d, two second connectors 12e, a third connector 12f, a fourth connector 12g, and a substrate 12h. The receiving socket 12a, the first conversion circuit 12b, the second conversion circuit 12c, the first connector 12d, the second connectors 12e, the third connector 12f, and the fourth connector 12g are located on the substrate 12h.

The receiving socket 12a is connected to the first conversion circuit 12b. The golden finger interface 11b is plugged into the receiving socket 12a. The first conversion circuit 12b is connected to the AC-DC voltage conversion circuit 11a via the receiving socket 12a and the golden finger interface 11b plugged into the receiving socket 12a.

The first connector 12d includes three first conductive pins 123. One end of each of the three first conductive pins 123 is connected to the first conversion circuit 12b, and the other end of each of the three first conductive pins 123 is detachably connected to the motherboard 20 via the first data line 40. Each of the second connectors 12e includes a second conductive pin 124. One end of each of the second conductive pins 124 is connected to the first conversion circuit 12b, and the other end of each of the second conductive pins 124 is detachably connected to the motherboard 20 via the second data line 50. The third connector 12f includes a third conductive pin 125 and a fourth conductive pin 126. The fourth connector 12g includes a fifth conductive pin 127, a sixth conductive pin 128, and a seventh conductive pin 129. One end of the third conductive pin 125 is connected to one end of the fifth conductive pin 127 via the second conversion circuit 12c, and the other end of the third conductive pin 125 is detachably connected to the motherboard 20 via the third data line 60. The other end of the fifth conductive pin 127 is connected to the fan 30 via the fourth data line 70. One end of the fourth conductive pin 126 is detachably connected to the motherboard 20 via the third data line 60, and the other end of the fourth conductive pin 126 is connected to one end of the sixth conductive pin 128. The other end of the sixth conductive pin 128 is detachably connected to the fan 30 via the fourth data line 70. One end of the seventh conductive pin 129 is connected to the first conversion circuit 12b, and the other end of the seventh conductive pin 129 is detachably connected to the fan 30 via the fourth data line 70.

The first conversion circuit 12b receives the first voltage and the second voltage from the power source 11, converts the first voltage into a third voltage, converts the second voltage into a fourth voltage, outputs the first voltage, the third voltage, and the fourth voltage to the first connector 12d, and outputs the first voltage to the second connectors 12e and the fourth connector 12g. The three first conductive pins 123 receive the first voltage, the third voltage, and the fourth voltage, respectively, and output the first voltage, the third voltage, and the fourth voltage to the motherboard 20 via the first data line 40, so as to supply the electrical power to the motherboard 20. In the present embodiment, the third and fourth voltages are 5V. The fourth voltage initializes the motherboard 20. The second conductive pins 124 receive the first voltage from the first conversion circuit 12b, and one of the second conductive pins 124 outputs the first voltage to the motherboard 20. The seventh conductive pin 129 receives the first voltage from the first conversion circuit 12b and outputs the first voltage to the fan 30, so as to supply the electrical power to the fan 30.

The motherboard 20 outputs the first control signal to the third conductive pin 125 via the third data line 60. The third conductive pin 125 receives the first control signal and outputs the first control signal to the second conversion circuit 12c. The second conversion circuit 12c converts the first control signal into a second control signal and outputs the second control signal to the fifth conductive pin 127. The fifth conductive pin 127 receives the second control signal and outputs the second control signal to the fan 30 via the fourth data line 70. The fan 30 operates based on the second control signal and outputs the feedback signal to the sixth conductive pin 128 via the fourth data line 70. The sixth conductive pin 128 receives the feedback signal and outputs the feedback signal to the motherboard 20 via the fourth conductive pin 126 and the third data line 60 in sequence. The motherboard 20 adjusts the first control signal based on the feedback signal so as to dynamically adjust the rotational speed of the fan 30. In the present embodiment, the first and second control signals are pulse width modulation (PWM) signals. A high-level voltage of the first control signal is 3.3V, and the high-level voltage of the second control signal is 5V.

As described above, since the electronic device 100 includes the power extending board 12, even though the power source 11 includes the golden finger interface 11b, the power source 11 is detachably connected to a standard power interface of the motherboard 20 via the power extending board 12, the first data line 40, the second data line 50, and the third data line 60. Therefore, a use of the power source 11 is broadened and simplified.

In addition, since the power extending board 12 is further detachably connected between the fan 30 and the motherboard 20 to relay the first control signal and the feedback signal between the fan 30 and the motherboard 20 to dynamically adjust the rotational speed of the fan 30, a connection between the fan 30 and the motherboard 20 is simplified.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A power extending board, configured to transfer a first voltage and a second voltage from a power source comprising a golden finger interface to a motherboard of an electronic device, the power extending board comprising:
   a substrate;
   a receiving socket positioned on the substrate and detachably connected to the golden finger interface of the power source;
   a first conversion circuit positioned on the substrate and connected to the receiving socket; the first conversion circuit receiving the first voltage and the second voltage from the power source via the golden finger interface and the receiving socket, converting the first voltage into a third voltage, converting the second voltage into a fourth voltage; and
   a first connector positioned on the substrate, the first connector comprising three first conductive pins, a first end of each of the three first conductive pins connected to the first conversion circuit, and a second end of each of the three first conductive pins being detachably connected to the motherboard of the electronic device, the three first conductive pins receiving the first, third, and fourth voltages respectively, and outputting the first, third, and fourth voltages to the motherboard.

2. The power extending board of claim 1, wherein the fourth voltage initializes the motherboard, and the third voltage differs from the first voltage.

3. The power extending board of claim 1, further comprising a second connector positioned on the substrate, wherein the second connector comprises a second conductive pin; a first end of the second conductive pin is connected to the first conversion circuit, and a second end of the second conductive pin is detachably connected to the motherboard; the second conductive pin receives the first voltage from the first conversion circuit, and outputs the first voltage to the motherboard.

4. The power extending board of claim 1, further comprising a third connector, a fourth connector, and a second conversion circuit, wherein the third connector, the fourth connector, and the second conversion circuit are positioned on the substrate; the third connector comprises a third conductive pin; a first end of the third conductive pin is connected to the second conversion circuit, and a second end of the third conductive pin is detachably connected to the motherboard; the fourth connector comprises a fourth conductive pin; a first end of the fourth conductive pin is connected to the second conversion circuit, and a second end of the fourth conductive pin is detachably connected to a fan; the third conductive pin receives a first control signal from the motherboard, and outputs the first control signal to the second conversion circuit; the second conversion circuit converts the first control signal into a second control signal, and outputs the second control signal to the fan via the fourth conductive pin, so as to control the rotational speed of the fan.

5. The power extending board of claim 4, wherein the first control signal and the second control signal are both power width modulation signals.

6. The power extending board of claim 4, wherein the fourth connector further comprises a fifth conductive pin; a first end of the fifth conductive pin is connected to the first conversion circuit, and a second end of the fifth conductive pin is detachably connected to the fan; the fifth conductive pin receives the first voltage from the first conversion circuit, and outputs the first voltage to the fan.

7. The power extending board of claim 4, wherein the third connector further comprises a sixth conductive pin, and the fourth connector further comprises a seventh conductive pin; a first end of the sixth conductive pin is connected to a first end of the seventh conductive pin, and a second end of the sixth conductive pin is detachably connected to the motherboard; a second end of the seventh conductive pin is detachably connected to the fan; the seventh conductive pin receives a feedback signal from the fan, and outputs the feedback signal to the motherboard via the sixth conductive pin, so as to adjust the first control signal; the feedback signal is representative of the current rotational speed of the fan.

8. A power supply system configured to supply electrical power to an electronic device comprising a motherboard, the power supply system comprising:
  a power source comprising a golden finger interface and outputting a first voltage and a second voltage via the golden finger interface; and
  a power extending board detachably connected between the power source and the motherboard, the power extending board comprising:
    a substrate;
    a receiving socket positioned on the substrate and detachably connected to the golden finger interface;
    a first conversion circuit positioned on the substrate and connected to the receiving socket, the first conversion circuit receiving the first voltage and the second voltage from the power source via the golden finger interface and the receiving socket, converting the first voltage into a third voltage, converting the second voltage into a fourth voltage, and outputting the first, third, and fourth voltages; and
    a first connector positioned on the substrate, comprising three first conductive pins, a first end of each of the three first conductive pins connected to the first conversion circuit, and a second end of each of the three first conductive pins detachably connected to the motherboard, the three first conductive pins receiving the first, third, and fourth voltages respectively, and outputting the first, third, and fourth voltages to the motherboard.

9. The power supply system of claim 8, wherein the fourth voltage initializes the motherboard, and the third voltage differs from the first voltage.

10. The power supply system of claim 8, wherein the power extending board further comprises a second connector positioned on the substrate; the second connector comprises a second conductive pin; a first end of the second conductive pin is connected to the first conversion circuit, and a second end of the second conductive pin is detachably connected to the motherboard; the second conductive pin receives the first voltage from the first conversion circuit, and outputs the first voltage to the motherboard.

11. The power supply system of claim 8, wherein the power extending board further comprises a third connector, a fourth connector, and a second conversion circuit; the third connector, the fourth connector, and the second conversion circuit are positioned on the substrate; the third connector comprises a third conductive pin; a first end of the third conductive pin is connected to the second conversion circuit, and a second end of the third conductive pin is detachably connected to the motherboard; the fourth connector comprises a fourth conductive pin; a first end of the fourth conductive pin is connected to the second conversion circuit, and a second end of the fourth conductive pin is detachably connected to a fan; the third conductive pin receives a first control signal from the motherboard, and outputs the first control signal to the second conversion circuit; the second conversion circuit converts the first control signal into a second control signal, and outputs the second control signal to the fan via the fourth conductive pin, so as to control the rotational speed of the fan.

12. The power supply system of claim 11, wherein the first control signal and the second control signal are both power width modulation signals.

13. The power supply system of claim 11, wherein the fourth connector further comprises a fifth conductive pin; a first end of the fifth conductive pin is connected to the first conversion circuit, and a second end of the fifth conductive pin is detachably connected to the fan; the fifth conductive pin receives the first voltage from the first conversion circuit, and outputs the first voltage to the fan.

14. The power supply system of claim 11, wherein the third connector further comprises a sixth conductive pin, and the fourth connector further comprises a seventh conductive pin; a first end of the sixth conductive pin is connected to a first end of the seventh conductive pin, and a second end of the sixth conductive pin is detachably connected to the motherboard; a second end of the seventh conductive pin is detachably connected to the fan; the seventh conductive pin receives a feedback signal from the fan, and outputs the feedback signal to the motherboard via the sixth conductive pin, so as to adjust the first control signal; the feedback signal is representative of the current rotational speed of the fan.

15. An electronic device, comprising:
  a motherboard; and
  a power supply system, comprising:
    a power source, comprising a golden finger interface, and outputting a first voltage and
    a second voltage via the golden finger interface; and
    a power extending board detachably connected between the power source and the motherboard, the power extending board comprising:
      a substrate;
      a receiving socket positioned on the substrate, and detachably connected to the golden finger interface;
      a first conversion circuit positioned on the substrate, and connected to the receiving socket, the first conversion circuit receiving the first voltage and the second voltage from the power source via the first, second conductive pins, converting the first voltage into a third voltage, converting the second voltage into a fourth voltage, and outputting the first, third, and fourth voltages; and
      a first connector positioned on the substrate, comprising three first conductive pins, a first end of each of the three first conductive pins connected to the first conversion circuit, and a second end of each of the three first conductive pins detachably connected to the motherboard, the three first conductive pins receiving the first, third, and fourth voltages respectively, and outputting the first, third, and fourth voltages to the motherboard.

16. The electronic device of claim 15, wherein the power extending board further comprises a second connector positioned on the substrate; the second connector comprises a second conductive pin; a first end of the second conductive pin is connected to the first conversion circuit, and a second end of the second conductive pin is detachably connected to the motherboard; the second conductive pin receives the first voltage from the first conversion circuit, and outputs the first voltage to the motherboard.

17. The power supply system of claim 15, further comprising a fan, wherein the power extending board further comprises a third connector, a fourth connector, and a second conversion circuit; the third connector, the fourth connector, and the second conversion circuit are positioned on the substrate; the third connector comprises a third conductive pin; a first end of the third conductive pin is connected to the second conversion circuit, and a second end of the third conductive pin is detachably connected to the motherboard; the fourth connector comprises a fourth conductive pin; a first end of the fourth conductive pin is connected to the second conversion circuit, and a second end of the fourth conductive pin is detachably connected to the fan; the third conductive pin receives a first control signal from the motherboard, and outputs the first control signal to the second conversion circuit; the second conversion circuit converts the first control signal into a second control signal, and outputs the second control signal to the fan via the fourth conductive pin, so as to control the rotational speed of the fan.

18. The power supply system of claim 17, wherein the first control signal and the second control signal are both power width modulation signals.

19. The power supply system of claim 17, wherein the fourth connector further comprises a fifth conductive pin; a first end of the fifth conductive pin is connected to the first conversion circuit, and a second end of the fifth conductive pin is detachably connected to the fan; the fifth conductive pin receives the first voltage from the first conversion circuit, and outputs the first voltage to the fan.

20. The power supply system of claim 17, wherein the third connector further comprises a sixth conductive pin, and the fourth connector further comprises a seventh conductive pin; a first end of the sixth conductive pin is connected to a first end of the seventh conductive pin, and a second end of the sixth conductive pin is detachably connected to the motherboard; a second end of the seventh conductive pin is detachably connected to the fan; the seventh conductive pin receives a feedback signal from the fan, and outputs the feedback signal to the motherboard via the sixth conductive pin, so as to adjust the first control signal; the feedback signal is representative of the current rotational speed of the fan.

* * * * *